UNITED STATES PATENT OFFICE.

HENRY NOEL POTTER, OF NEW ROCHELLE, NEW YORK, ASSIGNOR TO GEO. WESTINGHOUSE, OF PITTSBURG, PENNSYLVANIA.

METHOD OF MAKING SILICON.

No. 875,285.

Specification of Letters Patent.

Patented Dec. 31, 1907.

Application filed June 10, 1905. Serial No. 264,548.

*To all whom it may concern:*

Be it known that I, HENRY NOEL POTTER, a citizen of the United States, and resident of New Rochelle, county of Westchester, State of New York, have invented certain new and useful Improvements in Methods of Making Silicon, of which the following is a specification.

I have discovered a new reaction for producing silicon, namely $SiO + C = Si + CO$.

The reaction is accomplished by mixing the materials preferably in a fine state of subdivision and heating them sufficiently, preferably in a suitable electric furnace, in the absence of free oxygen or other reactive gas.

I claim as my invention:—

1. The method of producing silicon by reducing silicon monoxid.
2. The method of producing silicon by reducing silicon monoxid with carbon.
3. The method of producing silicon by heating together one equivalent of silicon monoxid and one equivalent of carbon.

Signed at New York, in the county of New York, and State of New York, this 7th day of June A. D. 1905.

HENRY NOEL POTTER.

Witnesses:
WM. H. CAPEL,
GEORGE H. STOCKBRIDGE.